Nov. 22, 1927.

J. A. THOMAS

PILOT LIGHT

Filed Feb. 23, 1926

1,650,401

Patented Nov. 22, 1927.

1,650,401

UNITED STATES PATENT OFFICE.

JAMES ALFRED THOMAS, OF ALBERT LEA, MINNESOTA.

PILOT LIGHT.

Application filed February 23, 1926. Serial No. 90,015.

The object of my invention is to provide a pilot light for automobiles which is simple, durable and of comparatively inexpensive construction.

More particularly my invention relates to a pilot light designed to be supported on the brace between the two front head lights of an automobile.

A further object of my invention is to provide such a light with an operating means consisting of a sliding rod mounted on the frame of the car which will be quickly moved a predetermined amount upon the movement of the steering wheel in either direction.

Still a further object is to provide means for operating the light during the first portion of the turning of the front wheels and to then leave it in this position during the rest of the steering movement.

With these and other objects in view, my invention consists in the construction, arrangement and combination of the various parts of my invention, whereby the objects contemplated are attained, as hereinafter more fully set forth, pointed out in my claims, and illustrated in the accompanying drawings, in which:

Figure 1, is a plan view of the front portion of an automobile showing my invention attached thereon and having one of the fenders removed.

Figure 2, is a side view of Figure 1.

Figure 3, is a sectional view on the line 3—3 of Figure 1.

Figures 4 and 5 are sectional views on the lines 4—4 and 5—5 of Figure 3.

Figure 6 is a sectional view on the line 6—6 of Figure 2.

Figure 7, is a sectional view on the line 7—7 of Figure 6, and

Figure 8, is a sectional view on the line 8—8 of Figure 2.

On the accompanying drawings I have used the reference numeral 10 to indicate the frame of an automobile.

The hood 11, fenders 12 and fender aprons 13 also form part of the automobile.

The head lights 14 have a brace 15 extending from one head light 14 to the other directly in front of the radiator 16.

Upon the braces 15 I mount a bracket 17 in the following manner.

A member 18 is secured to the bracket 17 and has cupped ends 19 which fit against the brace 15 and are secured thereto by means of U shaped bolts 20.

The pilot head light 21 is mounted in a yoke 22 which is pivotally mounted in the bracket 17 by means of a shaft 23 secured to the yoke 22.

An arm 24 is secured to the shaft 23 and is operatively connected with a bell crank 25 by means of a rod 26.

Mounted on the frame 10 adjacent to the steering arm 27 is a U shaped member 28 in which a rod 29 is slidably mounted.

Cross pieces 30 extend between the sides of the U shaped member 28 for holding the rod 29 in place.

A rod 31 is adjustably received in the end of the rod 29 and extends to the bell crank 25 and is operatively connected thereto.

From the foregoing it will be seen that any sliding movement of the rod 29 will through the rods 31 and 26, the bell crank 25 and the lever 24 cause pivotal movement of the pilot light 21.

For operatively connecting the steering arm 27 of the automobile with the rod 29, I have provided a bar 32 pivotally connected to the arm 27 by means of a clamp 33.

The bar 32 has a tongue 34 which is designed to engage with a notch 35 in the rod 29.

For keeping the tongue 34 in engagement with the notch 35, I provide a spring 36 attached to the bar 32 and to a bracket 37 extending from the U shaped member 28.

It will thus be seen that movement of the steering arm will cause the bar 32 to move longitudinally of the automobile and by the tongue 34 being in engagement with the notch 35, will cause the rod 29 to be slid between the U shaped member 28 and the cross pieces 30.

In a device of this type it is desirable to turn the pilot light quickly at the beginning of the steering operation when the driver turns to one side or the other of the road, and I have so arranged my parts that this is done.

It is further desirable to turn it quickly in a desired direction to a predetermined point and to leave it there during the rest of the turning operation. To accomplish this result, I provide notches 38 in the sides of the U shaped member 28. This forms a cam surface upon which the notches 39 of the bar 32 may travel.

During the central portion of the swinging movement of the steering arm 27, the notches 39 remain in the notch 38 and the rod 29 is slid in its bearings until the notches 39 engage the inclined surface 40 of the sides of the U shaped member 28.

This disengages the notch 35 leaving the rod 29 in the position shown in dotted lines in Figure 3.

Further movement of the bar 32 does not effect the position of the pilot light.

The notches 39 continue to ride on the inclined portions 40 and then onto the straight portions 41 of the sides of the U shaped member 28 during further steering movement of the steering arm 27.

When the steering arm 27 is brought back toward its central position, the notches 39 will travel down the incline surfaces 40 and the tongue 34 will reengage the notch 35 for bringing the rod 29 also back to a central position.

The same operation occurs when the steering wheel of the automobile is turned in the reverse direction and the rod 29 is then slid forward instead of backward, thus turning the light to the left instead of to the right.

The fingers 42 on the bar 32 prevent any displacement of the bar 32 relative to the U shaped member 28.

A slight amount of play is allowed between the tongue 34 and the notch 35 so that the pivotal movement of the pilot light 21 is not affected when driving in a straight course.

Thus it will be seen that I have provided a pilot light which is quickly turned to one side or the other of the road depending upon the direction of rotation of the steering wheel of the automobile during the first part of such rotation.

Further rotation of the steering wheel allows the pilot light to remain in the turned position and it is quickly brought back to center when the steering wheel is returned to its initial position.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. In combination with an automobile, a pilot light therefor comprising a light pivotally mounted, means for oscillating said light comprising a rod slidably mounted on the frame of said automobile and operatively connected to said pilot light, means for sliding said rod comprising a bar connected to the steering arm of said automobile and operatively engageable during a portion of its stroke with said rod and a spring for causing such engagement and means associated with said second bar to cause its disengagement from said first bar during the remaining portion if its stroke.

2. In combination with an automobile, a pilot light therefor comprising a light pivotally mounted, means for oscillating said light comprising a bell crank and a rod slidably mounted on the frame of said automobile, said rod being connected to said bell crank and a second rod for connecting said bell crank to said pilot light, means for sliding said rod comprising a rod connected to the steering arm of said automobile, a tongue on the end of said bar for engagement with a notch in said rod whereby swinging movement of said steering arm will impart sliding movement to said rod and a spring for causing such engagement.

3. In combination with an automobile having a brace connecting the head lights thereof, a pilot light pivotally mounted on said brace, a rod slidably mounted on the frame of said automobile adjacent the steering arm thereof, operative connecting means between said rod and said pilot light, a bar pivoted to said steering arm and having a tongue engageable with a notch in said rod whereby swinging movement of said steering arm will cause pivotal movement of said pilot light and a cam surface adjacent said rod for causing said tongue to engage said notch through only a limited portion of the distance of the swing of said steering arm.

4. In combination with an automobile, a pilot light therefor comprising a light pivotally mounted, means for oscillating said light comprising a rod slidably mounted on the frame of said automobile and operatively connected to said pilot light, means for sliding said rod comprising a bar connected to the steering arm of said automobile and operatively engageable with said rod, cam surfaces adjacent said rod, notches in said bar for travel on said cam surfaces, said cam surfaces being shaped substantially as shown for the purpose of preventing engagement of said bar with said rod except during the central portion of the movement of said steering arm and a spring for causing said notches to engage said cam surfaces.

5. A pilot light for automobiles comprising a pivotally mounted light and a rod operatively connected therewith, means for imparting a sliding movement to said rod comprising a bar connected to the steering arm of the automobile and engageable with said rod during a portion of the travel of said bar, a cam surface engageable by said bar for allowing engagement and disengagement of said bar from said rod as the bar travels and a spring for holding said bar in engagement with said cam surface.

Des Moines, Iowa, February 9, 1926.

JAMES ALFRED THOMAS.